(12) United States Patent
Miura et al.

(10) Patent No.: US 6,986,875 B2
(45) Date of Patent: Jan. 17, 2006

(54) PROCESS FOR PRODUCING ALUMINUM NITRIDE AND ALUMINUM NITRIDE

(75) Inventors: Hirohisa Miura, Ibaragi (JP); Hirofumi Matunaga, Ibaragi (JP); Tsutomu Tahara, Ibaragi (JP)

(73) Assignee: Ibaragi Laboratory Co., Ltd., Osaka (JP)

( * ) Notice: Subject to any disclaimer, the term of this patent is extended or adjusted under 35 U.S.C. 154(b) by 254 days.

(21) Appl. No.: 10/289,367

(22) Filed: Nov. 7, 2002

(65) Prior Publication Data

US 2003/0099590 A1    May 29, 2003

(30) Foreign Application Priority Data

Nov. 13, 2001  (JP) ............................. 2001-347687
Aug. 30, 2002  (JP) ............................. 2002-255772

(51) Int. Cl.
    *C01B 21/072* (2006.01)
(52) U.S. Cl. ..................................................... 423/412
(58) Field of Classification Search ................. 423/412
    See application file for complete search history.

(56) References Cited

U.S. PATENT DOCUMENTS

| | | | |
|---|---|---|---|
| 3,307,908 A | | 3/1967 | Mandorf |
| 3,653,830 A | * | 4/1972 | Komeya et al. ............ 423/412 |
| 4,322,395 A | * | 3/1982 | McHenry et al. ............ 423/412 |
| 4,929,433 A | * | 5/1990 | Hexemer et al. ............ 423/411 |
| 4,983,462 A | * | 1/1991 | Hiai et al. ................... 428/432 |
| 4,992,253 A | * | 2/1991 | Wu et al. .................... 423/412 |
| 5,002,904 A | * | 3/1991 | Jain et al. ....................... 501/80 |
| 5,219,804 A | * | 6/1993 | Weimer et al. ............. 501/98.4 |
| 5,710,382 A | | 1/1998 | Dunmead et al. |
| 5,837,633 A | | 11/1998 | Toriyama et al. |
| 5,876,682 A | * | 3/1999 | Kurihara et al. ............ 423/344 |
| 6,159,439 A | * | 12/2000 | Miura et al. ................. 423/412 |
| 6,423,287 B1 | * | 7/2002 | Chung et al. ............... 423/412 |
| 6,482,384 B1 | * | 11/2002 | Chung et al. ............... 423/412 |
| 2002/0122757 A1 | * | 9/2002 | Chung et al. ............... 422/199 |
| 2004/0022715 A1 | * | 2/2004 | Miura et al. ................. 423/412 |

FOREIGN PATENT DOCUMENTS

| | | |
|---|---|---|
| DE | 36 41 754 A1 | 6/1988 |
| EP | 0 371 771 A2 | 6/1990 |
| FR | 1 162 795 A | 9/1958 |
| JP | 62-56310 * | 3/1987 |
| JP | 1-275412 * | 11/1989 |

* cited by examiner

*Primary Examiner*—Wayne A. Langel
(74) *Attorney, Agent, or Firm*—Oliff & Berridge, PLC (57) ABSTRACT

A process for producing aluminum nitride includes a step of holding an aluminum powder in a nitrogen atmosphere whose nitrogen gas pressure falls in a range of from 105 to 300 kPa, thereby developing a nitriding reaction at a temperature of from 500 to 1,000° C., wherein a reaction controller gas, controlling the development of the nitriding reaction, is supplied into a reactor chamber in which the aluminum powder is accommodated. In the production process, the reaction controller gas is included in the nitrogen atmosphere in the development of the nitriding reaction. Accordingly, the development of the nitriding reaction is controlled so that it is possible to develop the nitriding reaction at a lower temperature. As a result, it is possible to produce an aluminum nitride powder whose particle diameters are fine.

10 Claims, 3 Drawing Sheets

PROCESS FOR PRODUCING ALUMINUM NITRIDE AND ALUMINUM NITRIDE

BACKGROUND OF THE INVENTION

1. Field of the Invention

The present invention relates to a process for producing aluminum nitride.

2. Description of the Related Art

Aluminum nitride (i.e., AlN) is good in terms of characteristics, such as heat resistance, thermal conductivity and electric conductivity, its applicable uses have been expanding. As for the applicable uses of aluminum nitride, it is possible to name containers for high-temperature applications, IC substrates, and so forth.

Industrial aluminum nitride is artificial ceramic which does not exist in nature. It is produced mainly by using two methods, the carbon reduction nitriding method of alumina and the direct nitriding method of aluminum.

(a) Carbon Reduction Nitriding Method of Alumina (i.e., $Al_2O_3 + 3C + N_2 \rightarrow 2AlN + 3CO$)

The carbon reduction nitriding method of alumina is a production process in which alumina having a high purity is reduced at a high temperature (e.g., from 1,700 to 1,900° C.) by graphite and a nitrogen gas and simultaneously aluminum formed by reducing is nitrided by nitrogen, thereby producing aluminum nitride.

However, it takes a long time for the carbon reduction nitriding method to complete the reaction. Accordingly, the production cost goes up so that a problem arises in that the resulting aluminum nitride is more expensive than the other ceramics, for example, silicon carbide (i.e., SiC), alumina, and so on.

(b) Direct Nitriding Method of Aluminum (i.e., $2Al + N_2 = 2AlN$)

The direct nitriding method of aluminum has been used since Briegleb et al. succeeded first in the synthesis in 1862. Since the reaction is an exothermic reaction, the direct nitriding method has an advantage in that it is possible to produce aluminum nitride with ease by simply putting pure aluminum in a nitrogen stream.

However, in the direct nitriding method of aluminum, the supply of nitrogen into aluminum is shut off by a nitrided film when the surface of aluminum is covered with the nitrided film. When the supply of nitrogen is shut off, the nitriding reaction of aluminum is terminated. Accordingly, the direct nitriding method of aluminum has a disadvantage in that it is not possible to obtain aluminum nitride of 100% purity. Consequently, the nitriding is carried out industrially while aluminum is heated to a temperature of from 1,000 to 2,000° C.

Moreover, in the direct nitriding method of aluminum, nitriding and pulverizing the resulting aluminum nitride are carried out repeatedly in order to raise the reaction yield, or an additional treatment, such as adding $AlF_3$ or AlN, is carried out in order to complete the reaction. However, since the bulks of aluminum nitride are hard, a variety of steps are required to pulverize them. As a result, the production cost goes up. Hence, the direct nitriding method of aluminum has a problem in that the resulting aluminum nitride is highly expensive.

U.S. Pat. No. 5,710,382 discloses a process for producing aluminum nitride by means of the direct nitriding method in which aluminum and aluminum nitride are used as raw materials. In the production process set forth in the U.S. Patent, two types of heating methods: namely, igniting the raw materials with an igniter; and heating them simply in a furnace, are disclosed as the method to initiate the nitriding reaction. According to the U.S. Patent, the peak temperature within the furnace and the peak temperature of a workpiece in the nitriding reaction are set at such a high temperature as from 1,845 to 2,115° C. when the raw materials are ignited with an igniter, and from 1,400 to 2,225° C. when they are heated with a furnace. Note that, in the nitriding reaction by heating with a furnace, the reaction initiation temperature is from 1,020 to 1,250° C. Accordingly, the peak temperature within the furnace and the peak temperature of the workpiece are much higher than the reaction initiation temperature. This is because the nitriding reaction is an exothermic reaction and the reaction heat of the nitriding reaction furthermore develops the nitriding reaction.

Thus, in the production process of aluminum nitride by means of the direct nitriding method, the peak temperature within the furnace and the peak temperature of the workpiece become high temperatures. Accordingly, the crystal growth and sintering of aluminum nitride occur. As a result, there is a problem in that the particle diameters of the resulting aluminum nitride particles are enlarged.

SUMMARY OF THE INVENTION

The present invention has been developed in view of the above-described circumstances. It is therefore an object of the present invention to provide a process for producing aluminum nitride whose particle diameters are fine.

In order to achieve the aforementioned object, the inventors of the present invention found out that it was possible to produce an aluminum nitride powder having fine particle diameters by containing a reaction controller gas, controlling the nitriding reaction, in a nitrogen gas atmosphere in the development of the nitrogen reaction.

Namely, a process for producing aluminum nitride according to the present invention comprises the step of: holding an aluminum powder in a nitrogen atmosphere whose nitrogen gas pressure falls in a range of from 105 to 300 kPa, thereby developing a nitriding reaction at a temperature of from 500 to 1,000° C., wherein a reaction controller gas, controlling the development of the nitriding reaction, is supplied into a reactor chamber in which the aluminum powder is accommodated.

In the present process for producing aluminum nitride, the reaction controller gas is contained in the nitrogen gas atmosphere in the development of the nitriding reaction so that the development of the nitriding reaction is controlled. Since the nitriding reaction being an exothermic reaction is controlled, the further nitriding reaction, induced by the reaction heat, is controlled. As a result, the chain-like nitriding reaction is less likely to develop so that it is possible to develop the nitriding reaction at a lower temperature. In accordance with the present process for producing aluminum nitride, it is possible to develop the nitriding reaction at a lower temperature. Accordingly, it is possible to produce an aluminum nitride powder whose particle diameters are fine. Moreover, in accordance with the present process for producing aluminum nitride, it is possible to inhibit the temperature of a workpiece from rising by releasing the heat, generating in the nitriding reaction, to the outside of the reactor chamber. Consequently, it is possible to produce a fine aluminum nitride powder.

Aluminum nitride according to the present invention is subjected to the step of: holding an aluminum powder in a nitrogen atmosphere whose nitrogen gas pressure falls in a range of from 105 to 300 kPa, thereby developing a nitriding reaction at a temperature of from 500 to 1,000° C., wherein a reaction controller gas, controlling the development of the nitriding reaction, is supplied into a reactor chamber in which the aluminum powder is accommodated.

When producing the present aluminum nitride, the reaction controller gas is supplied into the reactor chamber in the development of the nitriding reaction so that the development of the nitriding reaction, being an exothermic reaction, is controlled. Hence, the further nitriding reaction, induced by the reaction heat of the nitriding reaction, is controlled. Namely, when producing the present aluminum nitride, the nitriding reaction is developed at a lower temperature. As a result, the present aluminum nitride makes an aluminum nitride powder whose particle diameters are small. Moreover, when producing the present aluminum nitride, it is possible to inhibit the temperature of a workpiece from rising by releasing the heat, generating in the nitriding reaction, to the outside of the reactor chamber. Consequently, the present aluminum nitride makes an aluminum nitride powder whose particle diameters are fine.

Therefore, in accordance with the present process for producing aluminum nitride, the reaction controller gas is supplied into the reactor chamber in the development of the nitriding reaction. Accordingly, the development of the nitriding reaction is controlled. Since the nitriding reaction, being an exothermic reaction, is controlled, the further nitriding reaction, induced by the reaction heat, is controlled. Moreover, by releasing the heat, generating in the nitriding reaction, to the outside of the reactor chamber, it is possible to inhibit the temperature of a workpiece from rising. As result, the chain-like nitriding reaction is less likely to develop so that it is possible to develop the nitriding reaction at a lower temperature. In accordance with the present process for producing aluminum nitride, it is possible to carry out nitriding at a lower temperature. Consequently, it is possible to produce an aluminum nitride powder whose particle diameters are small. In addition, when using an aluminum nitride powder whose particle diameters are small as a raw material for substrates, it is possible to lower the temperature for calcining substrates. Therefore, it is possible to expect to actively use such an aluminum nitride powder as a raw material for high-quality substrates.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

Process for Producing Aluminum Nitride

In the present process for producing aluminum nitride, an aluminum powder is held in a nitrogen atmosphere whose nitrogen gas pressure falls in a range of from 105 to 300 kPa, thereby developing a nitriding reaction at a temperature of from 500 to 1,000° C.

Namely, in the present process for producing aluminum nitride, the nitriding reaction of aluminum is developed by holding an aluminum powder in an atmosphere of a predetermined nitrogen gas pressure and heating temperature. Note that, in general, the size of primary particle diameters of ceramic depends on the reaction initiation temperature. However, when there is a temperature increment by the subsequent reaction heat, crystalline particles are sintered and grown to coarsen. In the present production process, since the further temperature increment from the reaction initiation temperature is suppressed, it is possible to determine the particle diameters of aluminum nitride particles by the reaction temperature of the nitriding reaction. The lower the reaction temperature of the nitriding reaction is, the smaller the particle diameters are. The reaction temperature depends greatly on the types of raw materials and the particle diameters. For example, in an aluminum alloy containing magnesium, the reaction starts at a low temperature, for example, at 500° C. In an aluminum alloy containing silicon, the reaction starts at a high temperature. Moreover, the smaller the particle diameters of aluminum powder are, at the lower temperature the reaction starts. In a pure aluminum powder, the nitriding usually starts at from 550 to 700° C. For instance, in a pure aluminum powder whose particles have particle diameters of about 100 $\mu$m and are said to be coarse particles in general, the nitriding reaction starts at around 750° C. if a nitrogen absorption reaction is carried out in the middle of temperature increment.

When the nitrogen gas pressure is kept in a range of from 105 to 300 kPa, it is possible to supply the nitrogen gas to the aluminum powder in an amount sufficient for the nitriding reaction. For example, when the nitrogen gas pressure is less than 105 kPa, air intrudes from the outside so that there arises danger in that the aluminum powder is oxidized. On the other hand, when the nitrogen pressure exceeds 300 kPa, the rise of the reaction efficiency is hardly seen in the nitriding reaction, and the cost required for the production goes up.

Moreover, when the nitriding reaction temperature is less than 500° C., it takes longer till the nitriding reaction is initiated. On the other hand, when it exceeds 1,000° C., the particle diameters of the produced aluminum nitride particles are enlarged excessively.

In the direct nitriding method (i.e., $2Al+N_2 \_ 2AlN$) of an aluminum powder by a nitrogen gas, the free energy (i.e., the free energy of Gibbs) of the aluminum nitride formation is always negative. Accordingly, even when the temperature is less than 460° C., for example, it is thought that aluminum nitride is formed by holding an aluminum powder at the temperature for a long period of time. However, when it takes longer, the cost required for production goes up.

Moreover, in the nitriding reaction of an aluminum powder, the higher the temperature is, the faster the reaction rate is. Consequently, from the industrial viewpoint, the nitriding reaction is occurred at a little bit higher temperature, for instance, 500° C. or more. It is further preferred that the nitriding reaction temperature can desirably be 550° C. or more.

More specifically, according to experiments, the following were confirmed. When an aluminum powder is held in a nitrogen gas atmosphere of 520° C., the nitriding reaction is initiated after 3 to 30 hours pass, and is terminated at a nitriding yield of around 92%. The reason for taking such a long time for the nitriding reaction is to initiate the oxide film which is formed on the surface of aluminum. Moreover, in ordinary nitriding reactions at lower temperatures, it is not possible to reduce the aluminum oxide with nitrogen at the initial stage of the reactions. Namely, it takes time for nitrogen to gradually intrude into the inside of aluminum. The nitriding reactions are initiated rapidly after a certain period of time passes, and are terminated. Consequently, in nitriding treatments at lower temperatures, it is usually difficult to achieve the 100% nitriding.

Moreover, in the direct nitriding method of an aluminum powder, it is important to make the oxygen content in the nitrogen gas atmosphere low. This is because aluminum is a metal which is very likely to be oxidized. From this, the dew point in the reactor chamber can desirably be −50° C. or less.

In the present process for producing aluminum nitride, the reaction controller gas, controlling the development of the nitriding reaction, is supplied into the reactor chamber, in which the aluminum powder is accommodated, in the development of the nitriding reaction. Since the reaction controller gas is supplied into the reactor chamber, the chain-like development of the nitriding reaction of the aluminum powder is inhibited. Accordingly, it is possible to develop the nitriding reaction at a lower temperature.

Specifically, the direct nitriding reaction is a remarkable exothermic reaction, and generates heat in a quantity of 2,800 kcal (i.e., approx. $1.172 \times 10^4$ kJ) by nitriding 1 kg of aluminum theoretically. Moreover, in order to nitride 1 kg of aluminum, it is necessary to use a nitrogen gas in an amount of about 420 L. Accordingly, when the nitriding reaction is initiated in part of aluminum, the chain-like nitriding reaction is developed by the reaction heat so that the temperature of aluminum rises abruptly.

Usually, the temperature increment of aluminum is from 250 to 600° C. approximately. However, depending on the aluminum amount and the structure of reactor furnace, it becomes 1,000° C. or more. When the temperature of aluminum rises, the crystal growth of aluminum nitride particles is developed and the particles are sintered with each other. Thus, the resulting aluminum nitride particles are coarsened unpreferably.

In the present process for producing aluminum nitride, the aluminum powder which is to be nitrided may have an oxide film on the surface. This is because, in air, aluminum has such a characteristic that it causes reactions with oxygen, included in the air, to form a stable oxide film on the surface.

It is preferable to develop the nitriding reaction after the aluminum powder is subjected to a nitrogen occlusion treatment in which the aluminum powder is held in an nitrogen gas atmosphere of from 450 to 600° C. for 30 to 120 minutes to have nitrogen occluded therein. By having nitrogen occluded in the aluminum powder before the nitriding reaction is developed, nitrogen, which causes reactions with the aluminum powder in the subsequent nitriding reaction, is held adjacent to the aluminum powder. Accordingly, even when rapid reactions occur in the nitriding reaction, the amount of nitrogen required for the nitriding reaction is inhibited from being insufficient.

It has not been clear yet on the mechanism how nitrogen is occluded in the aluminum powder. However, it is assumed that nitrogen intrudes into the inside of aluminum along defects or grain boundaries from the surface of aluminum oxide, and that the aluminum oxide and nitrogen form conjugate compounds so that nitrogen is occluded inside the aluminum powder.

In the nitrogen occlusion treatment, the aluminum powder can preferably be heated at a temperature increment rate of 10° C./min. or less from a temperature of 460° C. or more to a nitriding temperature of the nitriding reaction. When the aluminum powder is heated at a temperature increment rate of 10° C./min. or less, it is possible for the aluminum powder to fully occlude nitrogen. On the other hand, when the temperature increment rate exceeds 10° C./min., the aluminum powder occludes nitrogen insufficiently so that aluminum remains in the resulting aluminum nitride.

In the nitrogen occlusion treatment, the aluminum powder can preferably be heated at a temperature increment rate of from 1 to 6° C./min. from a temperature of 460° C. or more to the nitriding temperature of the nitriding reaction. When the temperature increment rate is less than the lower limit of the range, it takes longer to heat the aluminum powder to the nitriding temperature. Accordingly, the temperature increment rate can preferably be from 1 to 6° C./min.

In the nitrogen occlusion treatment, the aluminum powder can preferably be held at a temperature of from 460° C. or more to 600° C. or less for a predetermined period of time. When the aluminum powder is held at a temperature of from 460° C. or more to 600° C. or less for a predetermined period of time, it is possible for the aluminum powder to occlude nitrogen in a sufficient amount.

In the nitrogen occlusion treatment, the predetermined period of time can preferably be from 5 to 30 minutes. When the aluminum powder is held at the temperature for a predetermined period of from 5 to 30 minutes, it is possible for the aluminum powder to occlude nitrogen in a sufficient amount.

After a predetermined time passes in the nitrogen occlusion treatment, the aluminum powder can preferably be heated at a temperature increment rate of 10° C./min. or more to the nitriding temperature of the nitriding reaction immediately. Note that holding the aluminum powder at the predetermined temperature for a longer period of time and increasing the temperature more slowly are not preferable, because they suddenly result in causing the ordinary nitriding reaction, accompanied by the reaction heat, at a certain time.

The nitriding reaction can preferably be developed while releasing heat, generated by the nitriding reaction, to the outside of the reactor chamber by way of a furnace wall of a reactor furnace, demarcating the reactor chamber, and controlling a temperature difference between a workpiece temperature and an initiation temperature of the nitriding reaction to 100° C. or less. When the temperature difference between the workpiece temperature and the initiation temperature of the nitriding reaction is controlled to 100° C. or less, it is possible to produce an aluminum nitride powder whose particle diameters are fine. Namely, the temperature of the workpiece is inhibited from rising in the development of the nitriding reaction. Accordingly, the chain-like nitriding reaction is inhibited from developing. Thus, it is possible to develop the nitriding reaction at a lower temperature.

Moreover, since the heat, generated by the nitriding reaction, is released to the outside of the reactor chamber by way of the furnace wall of the reactor furnace, demarcating the reactor chamber, it is possible to inhibit the workpiece temperature from rising.

The heat, generated by the nitriding reaction, can be released to the outside of the reactor chamber in the following manner. For example, the furnace wall of the reactor furnace is formed of a material of good thermal conduction, and the outside temperature of the reactor furnace is controlled so that it is lower than the inside temperature of the reactor furnace. Thus, it is possible to release the heat to the outside of the reactor chamber. In this instance, the outside temperature of the reactor furnace can be controlled so that it is lower than the inside temperature of the reactor furnace in the following fashion. For instance, reducing the heating capacity of a heater which causes the nitriding reaction and controls the reaction temperature of the nitriding reaction, or cooling the reactor furnace by supplying air to the outside of the reactor furnace.

In the present process for producing aluminum nitride, the workpiece refers to the aluminum powder in which the nitriding reaction is being developed. Namely, it refers to a state in which aluminum nitride, formed by the nitriding reaction, is mixed with aluminum in which no nitriding reaction occurs.

In the nitriding reaction, the peak temperature of the workpiece can preferably be 900° C. or less when the nitriding reaction of the aluminum powder is developed. Here, the peak temperature refers to the highest temperature of the workpiece which is increased by the nitriding reaction. When the peak temperature is controlled to 900° C. or less, it is possible to produce an aluminum nitride powder whose particle diameters are fine. When the peak temperature exceeds 900° C., the resulting aluminum nitride particles are coarsened by crystal growth and sintering.

The nitrogen gas atmosphere can preferably be maintained by a nitrogen gas, which is delivered from a nitrogen supplying apparatus for supplying a nitrogen gas continuously to the reactor chamber, and a nitrogen gas, which is discharged from a discharging apparatus for discharging a nitrogen gas from the reactor chamber. Namely, it is possible to maintain the nitrogen gas pressure of the reactor chamber in which the aluminum powder is accommodated by a nitrogen gas, supplied from the nitrogen supplying apparatus, and a nitrogen gas, discharged from the discharging apparatus.

Specifically, the nitriding reaction of the aluminum powder is developed rapidly. Accordingly, when the nitriding reaction is initiated, the nitrogen in the reactor chamber is consumed so that the nitrogen gas pressure drops sharply. Consequently, when the nitrogen gas pressure within the reactor chamber is maintained with the nitrogen supplying apparatus and the discharging apparatus, it is possible to inhibit the nitrogen gas pressure within the reactor chamber from varying.

Moreover, when the respective pressures of the nitrogen gas, supplied from the nitrogen supplying apparatus, and the nitrogen gas, discharged from the discharging apparatus, are measured, it is possible to determine the nitrogen gas pressure within the reactor chamber. In addition, it is possible to calculate the nitrogen occlusion in the aluminum powder in the nitrogen occlusion treatment, and to calculate the nitrogen gas drop in the developing nitriding reaction.

It is preferable to supply the reaction controller gas to the reactor chamber when the nitrogen gas pressure within the reactor chamber drops. The reaction controller gas is a gas which is supplied into the reactor chamber when the nitriding reaction is initiated. By measuring the nitrogen gas pressure, it is possible to observe the initiation of the nitriding reaction. This is because, when the nitriding reaction is initiated, the nitrogen gas, constituting the nitrogen gas atmosphere, is caused to react with the aluminum powder so that the nitrogen gas amount is reduced within the reactor chamber and the nitrogen gas pressure is lowered. Accordingly, by supplying the reaction controller gas to the reactor chamber when the nitrogen gas pressure drops, it is possible to control the development of the nitriding reaction.

It is preferable to start supplying the reaction controller gas into the reactor chamber when the nitrogen gas pressure within the reactor chamber drops, and to terminate it when the nitrogen gas pressure within the reactor chamber recovers. This is because the recovery of the nitrogen gas pressure occurs when the consumption of nitrogen in the nitriding reaction is reduced, and accordingly the recovery means that the nitriding reaction is terminated.

It is preferable to supply the reaction controller gas into the reactor chamber when the workpiece temperature rises. The reaction controller gas is supplied into the reactor chamber when the nitriding reaction is initiated. Meanwhile, it is possible to observe the initiation of the nitriding reaction by measuring the workpiece temperature. This is because, when the nitriding reaction is initiated, the reaction heat is generated so that the workpiece temperature rises.

The reaction controller gas can preferably at least one member selected from the group consisting of an argon gas and an ammonia gas. These gases can control the development of the nitriding reaction.

The argon gas is used as a carrier gas for a nitrogen gas in the plasma nitriding of alumina. The plasma nitriding is carried out by using a mixture gas in which from 5 to 20% by volume of a nitrogen gas is mixed with the balance of an argon gas.

It has not been known that an argon gas is actually used in the ordinary direct nitriding of aluminum. In 1992, a report (Itoh and Enami et al., Tokyo University of Science, Journal of the Ceramic Society of Japan 100 [5] pp. 629–633 (1992)) was published on a research of a "method of producing aluminum nitride in which an aluminum powder whose surface is oxidized is used a raw material." In the report, an example was reported in which a nitriding experiment was carried out by a nitrogen gas in which an argon gas was added in an amount of from 30 to 70% by volume. In the example, aluminum nitride was produced at a reaction temperature of from 900 to 1,300° C. while supplying a predetermined amount of the argon gas from the beginning to the end, and the nitriding yield and the pulverizability of the reaction product were surveyed after 2 hours and 5 hours passed from the initiation of the reaction.

According to the report, the nitriding reaction occurred in all the temperature ranges and at all the argon contents, and the highest nitriding yield of 94% was obtained. The researchers interpreted that the value of the highest nitriding yield was due to oxidation. Moreover, in the report, the researchers reported that the nitriding yield of 97.5% was obtained by using a mixture gas whose argon gas content was 10% by volume. The researchers further reported that, regardless of the argon gas contents, the pulverizability was enhanced in all the reaction products.

On the other hand, the present inventors surveyed how the addition of an argon gas effected to the nitriding reaction in a low temperature region of from 600 to 750° C. Note that, in the survey, the argon gas was supplied from the beginning of the nitriding reaction to the end in such a proportion as 30% by volume or more with respect to the entire supplied mixture gas taken as 100% by volume.

According to the result of the survey on how the addition of an argon gas effected the nitriding reaction in a lower temperature, the nitriding reaction was not initiated at all when the argon gas content was 50% by volume or more. Moreover, when an argon gas was supplied in a proportion of 50% by volume or more while the nitriding reaction was developed by a pure nitrogen gas only, the present inventors confirmed that the nitriding reaction was terminated.

Moreover, the present inventors confirmed that the nitriding reaction was developed, though it was developed slowly, when an argon gas was supplied in a proportion of from 3 to 20% by volume while the nitriding reaction was developed by a pure nitrogen gas only. According to the aforementioned report on the research, when a nitrogen gas was used in which an argon gas was mixed in a proportion of from 30 to 70% by volume, no influence of the argon gas was seen at all in the reaction temperature range of from 900 to 1,300° C., and the nitriding reaction occurred. On the other hand, in the heating temperature region of from 600 to 750° C. according to the present process for producing aluminum nitride, the nitriding reaction is terminated or is developed slowly. The difference seems to lie in the temperature difference, however, it is believed that the difference results from the reactive difference, i.e., the nitriding reaction disclosed in the report occurred in liquid phase, but the nitriding reaction according to the present invention occurs in solid phase.

In addition, an ammonia gas is added to a nitrogen gas in a trace amount as a nitriding agent in nitriding aluminum or steel. Similarly to the case of an argon gas, the reactivity of ammonia gas was surveyed in a temperature range of from 600 to 750° C. as a result, the present inventors however confirmed that the nitriding reaction was terminated. Namely, it is possible to temporarily terminate the nitriding reaction by supplying an ammonia gas into the reactor chamber when the nitriding reaction is developed. Note that it has not been cleared yet why the nitriding reaction is terminated by supplying an ammonia gas. However, it is assumed that, since the raw material is solid in the experimental temperature range, compounds, such as $AlH_3$, are formed in the solid-phase aluminum powder to interfere the intrusion of nitrogen gas.

Therefore, it is preferable to supply the reaction controller gas into the reactor chamber in a proportion of from 1 to 50% by volume when the amount of the entire gas, supplied into the reactor chamber, is taken as 100% by volume.

In the present process for producing aluminum nitride, it is preferable to stop supplying the reaction controller gas into the reactor chamber immediately before the nitriding reaction is completed, and to increase the reaction temperature by 30 to 120° C. By stopping the supply of the reaction controller gas as well as by increasing the reaction temperature, it is possible to nitride all the raw aluminum powder.

The aluminum powder can preferably be in a non-compressed assembly state. When the aluminum powder is in a non-compressed assembly state, the formed aluminum nitride particles are inhibited from sintering with the neighboring aluminum nitride particles. The transformation from aluminum to aluminum nitride is accompanied by volumetric expansion. Accordingly, when the aluminum powder is in a compressed assembly state, the formed aluminum nitride particles cause sintering to lower the pulverizability. Moreover, when the aluminum powder is in a non-compressed assembly state, it can occlude nitrogen in the nitrogen occlusion treatment. In other words, when the aluminum powder is in a non-compressed assembly state, the respective particles of the aluminum powder can contact with the nitrogen gas with a sufficient superficial area so that the aluminum powder can fully occlude nitrogen therein.

The aluminum powder can preferably be divided into a plurality of sections and be accommodated in the reactor chamber. When the aluminum powder is divided into a plurality of sections and each of the sections is accommodated in the reactor chamber, the produced aluminum nitride makes particles whose particle diameters are inhibited from fluctuating. Thus, it is possible to control the nitriding reaction for the every section of the aluminum powder.

Specifically, when the nitriding reaction is developed in such a state that a large amount of the aluminum powder is accommodated in the reactor chamber in a non-compressed assembly manner, there arises a temperature difference between the inside of the aluminum powder assembly and the superficial layer thereof. Accordingly, it is difficult to observe and control the nitriding reaction inside the aluminum powder assembly. Hence, the particle diameters of the resulting aluminum nitride particles fluctuate greatly. On the other hand, when a small amount of the aluminum powder is accommodated in the reactor chamber in a manner divided into a plurality of sections, it is easy to observe and control the nitriding reaction inside the respective sections of the aluminum powder assembly. Therefore, the particle diameters of the resulting aluminum nitride particles are inhibited from fluctuating.

When the aluminum powder is divided into a plurality of sections and each of the sections is accommodated in the reactor chamber, the larger the number of sections is the more the particle diameters of the produced aluminum nitride particles are inhibited from fluctuating.

The way how to divide the aluminum powder into a plurality of sections and accommodate them in the reactor chamber is not limited in particular. For example, it is possible to name a plurality of reactor trays which hold the divided aluminum powder therein and which are laminated and accommodated in the reactor chamber.

The time required for the nitriding reaction to complete can preferably be from 2 to 10 hours after the temperature of the aluminum powder reaches a predetermined reaction temperature. When the reaction time is controlled in a range of from 2 to 10 hours, it is possible to produce an aluminum nitride powder whose particle diameters are small. When the time required for the nitriding reaction to complete is less than 2 hours, the development rate of the nitriding reaction is so fast that the produced aluminum nitride particles agglomerate. On the other hand, when the time required for the nitriding reaction to complete exceeds 10 hours, it takes longer to heat the aluminum powder so that the cost required for producing an aluminum nitride powder goes up.

The reaction controller gas can preferably be supplied in the following manner. For example, the supply of the reaction controller gas is started when the aluminum nitride powder is heated to a predetermined reaction temperature, the supply amount of the reaction controller gas is increased gradually to a predetermined partial gas pressure which can control the development of the nitriding reaction, the partial gas pressure of the reaction controller gas is decreased gradually after maintaining the predetermined partial gas pressure for a predetermined period of time, and the supply of the reaction controller gas is stopped. By controlling the supply amount of the reaction controller gas into the reactor chamber, it is possible to control the development of the nitriding reaction. The nitriding reaction is initiated after the temperature of the aluminum powder reaches a predetermined nitriding temperature. In this instance, however, when a large amount of the reaction controller gas exists within the reactor chamber, it takes longer to initiate the nitriding reaction. Accordingly, when the partial gas pressure of the reaction controller gas is made smaller, the nitriding reaction can be initiated. Then, when the nitriding reaction is developed, the reaction controller gas is supplied into the reactor chamber in such a sufficient amount that the nitriding reaction can be inhibited from developing in a chain-like manner. Thereafter, when the aluminum powder is fully nitrided, the supply of the reaction controller gas is decreased gradually to stop. By gradually decreasing the supply of the reaction controller gas, it is possible to inhibit the nitriding reaction from developing rapidly in the aluminum powder which has not been nitrided.

The partial gas pressure of the reaction controller gas can preferably be maintained for a time period in which the aluminum powder is nitrided by a proportion of from ½ to ¾ by weight. It is possible to calculate the nitriding amount of the aluminum powder from the variation of the weight of the aluminum powder and the variation of the partial nitrogen gas pressure within the reactor chamber.

Moreover, it is preferable to further supply a nitrogen gas into the reactor chamber after the supply of the reaction controller gas is stopped. When a nitrogen gas is further supplied after the supply of the reaction controller gas is stopped, it is possible to nitride the aluminum powder which has not been nitrided. In this instance, since most of the aluminum powder is nitrided, such chain-like nitriding reactions that cause violent temperature increments are hardly developed. Accordingly, it is not necessary to control the nitriding reaction.

In the present process for producing aluminum nitride, since the reaction controller gas is supplied when the nitriding reaction is developed, the development of the nitriding reaction is controlled. Namely, since the development of the nitriding reaction, which is an exothermic reaction, is controlled, the further nitriding reaction caused by the reaction heat is controlled. As a result, the chain-like nitriding reaction hardly develops so that it is possible to develop the nitriding reaction at a lower temperature. In accordance with present production process, it is possible to carry out nitriding at a lower temperature. Thus, it is possible to produce an aluminum nitride powder whose particle diameters are small.

Aluminum Nitride

Aluminum nitride according to the present invention is subjected to the step of: holding an aluminum powder in a nitrogen atmosphere whose nitrogen gas pressure falls in a range of from 105 to 300 kPa, thereby developing a nitriding reaction at a temperature of from 500 to 1,000° C., wherein a reaction controller gas, controlling the development of the nitriding reaction, is supplied into a reactor chamber in which the aluminum powder is accommodated.

Namely, when the present aluminum nitride is produced, the nitriding reaction is developed at a lower temperature because the reaction controller gas is supplied while the nitriding reaction of the aluminum powder is developed in the nitrogen gas atmosphere. Note that, in general, the size of primary particle diameters of ceramic depends on the reaction initiation temperature. In the present aluminum nitride, the particle diameters of the aluminum nitride particles are determined by the initiation temperature of the nitriding reaction. Since the nitriding reaction is developed at a lower temperature, the present aluminum nitride makes an aluminum nitride powder whose particle diameters are small.

Except the following specific arrangements, the arrangements of the present aluminum nitride are same as those of the present process for producing aluminum nitride. Therefore, the same specific arrangements will not be described in detail herein. The present aluminum nitride can preferably have particle diameters of 1 $\mu$m or less and exhibit a specific surface area of 2.5 m$^2$/g or more. When the particle diameters are 1 $\mu$m or less and the specific surface area is 2.5 m$^2$/g or more, the present aluminum nitride makes an aluminum nitride powder whose particle diameters are small.

EXAMPLES

The present invention will be hereinafter described with reference to specific examples.

Figure 1:
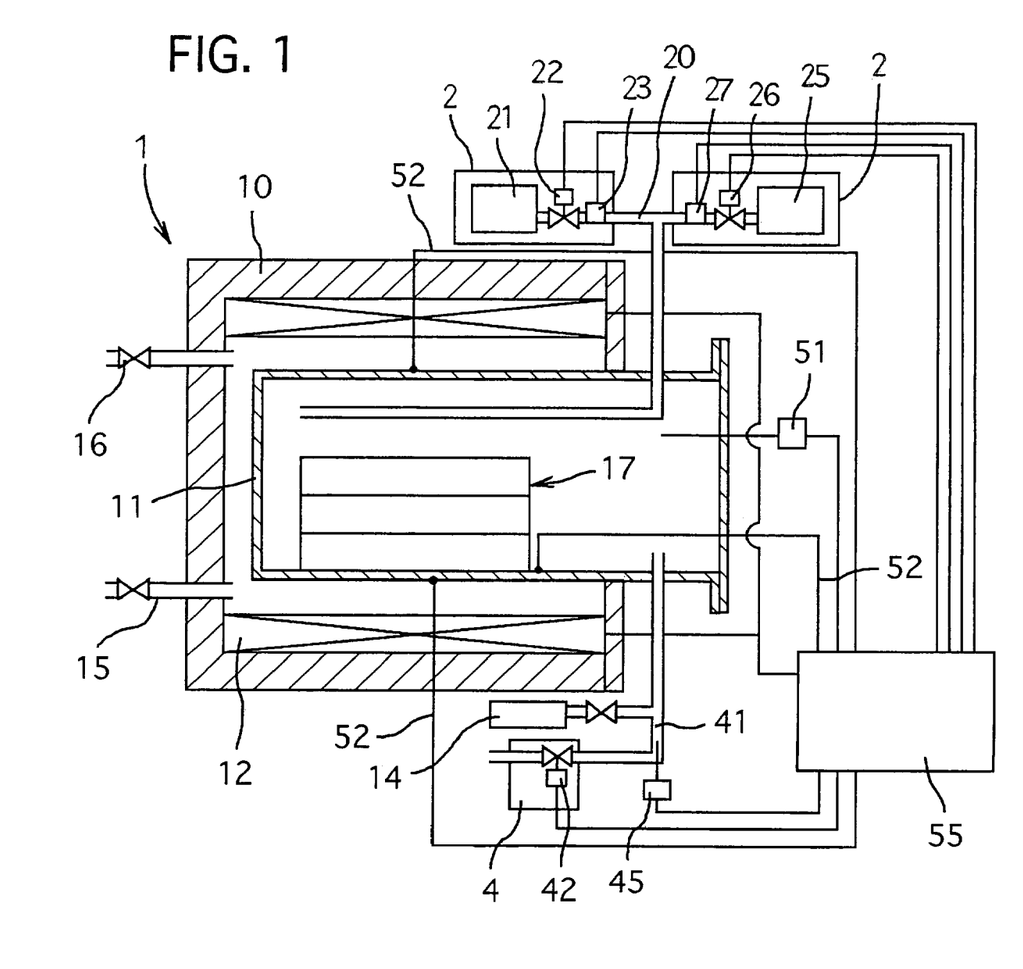
FIG. 1 is a drawing for illustrating the constitution of a nitriding ffirnace which was used in examples according the present invention.

As an example according to the present invention, a nitriding furnace was manufactured, and an aluminum powder was nitrided by using the nitriding furnace. FIG. 1 illustrates the constitution of the manufactured nitriding furnace.

Nitriding Furnace

The nitriding furnace 1 was an electric furnace which comprised a box-shaped furnace shell 10, a heat-resistant muffle 11, and a heater 12. The heat-resistant muffle 11 was held inside the furnace shell 10, and had reinforcement ribs. Moreover, the heat-resistant muffle 11 had a furnace wall made of a stainless steel (e.g., SUS304 as per Japanese Industrial Standard). The furnace wall had a thickness of 6 mm. The heat-resistant muffle 11 had an inner capacity of 80 L. The heater 12 was disposed in the furnace shell 10 so as to face an outer peripheral surface of the heat-resistant muffle 11.

The heat-resistant muffle 11 had an air-tight furnace structure which could hold a pressure of 0.1 kPa when it was vacuumed by a vacuum pump 14.

In the nitriding furnace 1, there was a space of about 70 mm between an inner peripheral surface of the furnace shell 10 and a bottom surface of the heat-resistant muffle 11. The nitriding furnace 1 was equipped with an air supplying apparatus 15, which supplied air to the space, and with an air discharging apparatus 16, which discharged the air within the space. Note that the air supplying apparatus 15 could supply industry air whose pressure was 0.6 MPa into the space between the furnace shell 10 and the heat-resistant muffle 11.

Moreover, the nitriding furnace 1 was equipped with a gas supplying apparatus 2. The gas supplying apparatus 2 could supply a nitrogen gas and an argon gas into the heat-resistant muffle 11.

The gas supplying apparatus 2 comprised a nitrogen gas bomb 21, an argon gas bomb 25, a pipe passage 20, valves 22 and 26, and mass flowmeters 23 and 27. The pipe passage 20 was connected with the nitrogen gas bomb 21 and the argon gas bomb 25 at one of the opposite ends, and was opened so as to face the furnace wall of the heat-resistant muffle 11 at the other one of the opposite ends. The valves 22 and 26 were disposed at the connections between the pipe passage 20 and the nitrogen gas bomb 21 and between the pipe passage 20 and the argon gas bomb 25, respectively. The mass flowmeters 23 and 27 are disposed in the pipe passage 20, and measured the flow rate of the gases which passed in the pipe passage 20. The mass flowmeters 23 and 27 were made by YAMATAKE Co., Ltd. Note that it was possible to appropriately control the flow rate of the gases, which were supplied from the gas supplying apparatus 2, in a range of from 2 to 50 L/min. by the mass flowmeters 23 and 27.

Further, the nitriding furnace 1 comprised a discharging apparatus 4 which discharged the gases within the heat-resistant muffle 11 to the outside. The discharging apparatus 4 included a pipe passage 41, and a discharging valve 42. The pipe passage 41 was opened into the heat-resistant muffle 11 at one of the opposite ends, and was opened to the outside of the nitriding furnace 1 at the other opposite ends. The discharging valve 42 was disposed in the pipe passage 41, and controlled the flow rate of the gases which passed in the pipe passage 41.

Furthermore, the nitriding furnace 1 was equipped with a pressure gage 51 which measured the gas pressure within the heat-resistant muffle 11. The pressure gage 51 was made by CKD Co., Ltd., its measurable range was from 0 to 200 kPa, and its number of contacts was four.

Moreover, the nitriding furnace 1 was equipped with four thermocouples 52. The thermocouples 52 measured the temperature of the heat-resistant muffle 11 at four positions, i.e., at the inside of the bottom furnace wall of the heat-resistant muffle 11, at the outside of the bottom surface wall of the heat-resistant muffle 11, at the top furnace wall of the heat-resistant muffle 11, and in an aluminum powder which was held in the heat-resistant muffle The nitriding furnace 1 was further comprised a computing apparatus 55 which was connected electrically with the air supplying apparatus 15, the air discharging apparatus 16, the pressure gage 51, the thermocouples 52, and the valves 22, 26 and 42. The computing apparatus 55 could compute environmental variables within the heat-resistant muffle 11 from data measured by devices, such as the pressure gage 51 and the thermocouples 52, could determine the opening magnitude of the valves 22, 26 and 42 according to deviations from desirable set conditions, and could open and close the respective valves 22, 26 and 42. Further, the computing apparatus 55 could maintain the temperature of the heat-resistant muffle 11 at a desirable temperature by actuating the air supplying apparatus 15 and the air discharging apparatus 16. Furthermore, the computing apparatus 55 could have a not-shown output apparatus display measured data.

Moreover, an aluminum powder which was to be nitrided by the nitriding furnace 1 was accommodated in the heat-resistant muffle 11 in such a state that it was stored in a box-shaped reactor tray 17. The reactor tray 17 was made of graphite, and had an inner capacity of 6 L. Note that, depending on the amounts of the aluminum powder, the reactor tray 17 was laminated in one to three stages to use.

Example No. 1

As Example No. 1, a high-purity aluminum powder whose average particle diameter was 30 μm was nitrided by using the nitriding furnace 1 to produce an aluminum nitride powder. The aluminum powder was produced by TOYO ALUMINIUM Co., Ltd., and its purity was 99.7%.

First, 500 g of the raw aluminum powder and 500 g of an aluminum nitride powder were mixed fully with a hand mixer. The aluminum nitride powder was produced by TOYO ALUMINIUM Co., Ltd., and its whose average particle diameter was 1.6 μm. Table 1 below sets forth the mixing proportions of the raw materials.

TABLE 1

| Ex. | Raw Material | | |
|---|---|---|---|
| | Al Powder (g) | Al Foil (g) | AlN Powder (g) |
| No. 1 | 500 | 0 | 500 |
| No. 2 | 300 | 200 | 500 |
| No. 3 | 700 | 300 | 500 |
| No. 4 | Upper Stage: 500 | 0 | Upper Stage: 500 |
| | Lower Stage: 500 | 0 | Lower Stage: 500 |
| No. 5 | Upper Stage: 400 | 0 | Upper Stage: 600 |
| | Middle Stage: 400 | 0 | Middle Stage: 600 |
| | Lower Stage: 400 | 0 | Lower Stage: 600 |
| No. 6 | 1,000 | 0 | 1,500 |
| No. 7 | Upper Stage: 1,000 | 0 | Upper Stage: 1,500 |
| | Lower Stage: 1,000 | 0 | Lower Stage: 1,500 |

Then, the raw mixture powder was stored in the reactor tray 17. The reactor tray 17 was placed at the center in the heat-resistant muffle 11. The reactor tray 17 was used independently in one stage. Note that the raw mixture powder was not compressed when it was stored in the reactor tray 17.

Thereafter, the valve 22 of the gas supplying apparatus 2 and the valve 42 of the discharging apparatus 4 were opened to keep supplying a nitrogen gas into the heat-resistant muffle 11 at a flow rate of 10 L/min. The pressure within the heat-resistant muffle 11 was kept in a range of from 115 to 125 kPa. Accordingly, within the heat-resistant muffle 11, the dew point was −50° C. or less when the temperature was raised to 450° C. Note that the dew point was observed by using a dew-point hygrometer 45 which was disposed to detect inside the pipe passage 41 of the discharging apparatus 4.

While supplying the nitrogen gas into the heat-resistant muffle 11 at the flowrate of 10 L/min., the heater 12 of the nitriding furnace 1 was turned on to increase the temperature within the heat-resistant muffle 11 to 460° C. at a temperature increment rate of 7° C./min. Then, the temperature was kept for 30 minutes.

Subsequently, the temperature within the heat-resistant muffle 11 was increased to 630° C. at a temperature increment rate of 5° C./min. to develop the nitriding reaction under processing conditions set forth in Table 2 below.

TABLE 2

| | Set Condition | | | |
|---|---|---|---|---|
| Ex. | N₂ Occlusion Reaction Temp. (° C.) | N₂ Occlusion Reaction Time (min.) | Temp. Increment Rate (° C./min.) | Nitriding Reaction Temp. (° C.) |
| No.1 | 460 | 30 | 5 | 630 |
| No.2 | 460 | 30 | 5 | 1st: 640 |
| | | | | 2nd: 750 |
| No.3 | 460 | 30 | 5 | 630 |

TABLE 2-continued

| | Set Condition | | | |
|---|---|---|---|---|
| Ex. | $N_2$ Occlusion Reaction Temp. (° C.) | $N_2$ Occlusion Reaction Time (min.) | Temp. Increment Rate (° C./min.) | Nitriding Reaction Temp. (° C.) |
| No.4 | 460 | 30 | 5 | 630 |
| No.5 | 460 | 30 | 5 | 640 |
| No.6 | 460 | 30 | 10 | 670 |
| No.7 | 460 | 30 | 10 | 1st: 670 |
| | | | | 2nd: 700 |

Descriptions will be hereinafter made on the flow rates of the nitrogen gas and argon gas, the electricity supply, the temperatures, resulting from the flow rates and electricity supply, within the heat-resistant muffle 11 as well as in the workpiece, and the temperature difference between the inside and outside of the furnace wall of the heat-resistance muffle 11. When the temperature within the heat-resistant muffle 11 reached 630° C., the temperature was maintained, and the valve 26 of the gas supplying apparatus 2 was opened to supply an argon gas into the heat-resistant muffle 11 at a flow rate of 3 L/min.

In the middle of the operation, when the rate of the nitriding reaction was slow, the valve 26 was closed to decrease or stop the supply of the argon gas, and the valve 22 is further opened to increase the flow rate of the nitrogen gas to 13 L/min. Thus, the nitriding reaction was developed. Note that the rate of the nitriding reaction was observed by means of the temperatures measured by the thermocouples 52 and the gas pressure within the heat-resistant muffler 11 measured by the pressure gage 51.

Thereafter, when the nitriding reaction was developed, the valve 26 was opened to supply the argon gas into the heat-resistant muffle 11 at a flow rate of 1.5 L/min. again.

When the gas pressure within the heat-resistant muffle 11 regained, the valve 26 was closed, and the valve 22 was opened to increase the flow rate of the nitrogen gas to 15 L/min. After the aluminum powder was held in this state for 20 minutes, no gas pressure drop and temperature increment were observed. Thus, the termination of the nitriding reaction was confirmed. The reaction time was exactly 3 hours.

Note that the reaction temperature was controlled by adjusting the electricity supply to the heater 12 in a range from 36 to 50% in the development of the nitriding reaction. Moreover, the temperature difference fell in a range of from 20 to 30° C. between the inside and outside of the furnace wall of the heat-resistant muffle 11.

Finally, the heat-resistant muffle 11 was cooled, and an aluminum nitride powder in the reactor tray 17 was collected. Table 3 below sets forth the reaction conditions of the nitriding reaction and the operating conditions of the nitriding furnace 1. Thus, the aluminum nitride powder of Example No. 1 was produced.

TABLE 3

| | Condition of Nitriding Reaction | | | | | | | |
|---|---|---|---|---|---|---|---|---|
| | | Gas Mixture Ratio ($N_2$ gas (L/min.)/Ar gas (L/min.)) | | | | Operating Condition of Nitriding Furnace | | |
| Ex. | Supplied Electricity (%) | When Reaction Started | 1st Interval | 2nd Interval | Final | Reaction Time (hr.) | Temp. of Workpiece (° C.) | Temp. Difference* (° C.) |
| No.1 | 36–50 | 10/3 | 13/0 | 13/1.5 | 15/0 | 3.0 | 610–640 | 20–30 |
| No.2 | 30–70 (controlled automatically) | 10/3 | 13/0 | 13/3 | 15/0 | 5.0 | 730–770 | 30–70 |
| No.3 | 40–50 | 10/3 | 13/0 | 13/0.3–13/0.8 | 15/0 | 3.5 | 620–670 | 15–50 |
| No.4 | 30–70 | 10/3 | 13/0 | 13/0.3–13/0.8 | 15/0 | 3.3 | 630–670 | 5–80 |
| No.5 | 30–70 (controlled automatically) | 10/3 | 13/0.8–13/1.5 | 13/0.3 or 13/1.0 | 15/0 | 3.7 | 600–660 | 20–90 |
| No.6 | 10–55 | 8/2 | 8/6 | 8/4 | 10/0 | 2.0 | 677–723 | 5–50 |
| No.7 | 30–76 | 8/2 | 8/3.6 | 8/3.6 | 10/0 | 3.5 | 670–716 | 5–40 |

*"Temp. Difference" refers to the difference between the inside temperature and outside temperature of the heat-resistance muffler 11.

Assessment

The aluminum nitride powder of Example No. 1 was collected in an amount of 1,260 g. Since 500 g of the aluminum nitride powder was used as part of the raw material, aluminum nitride was formed in an amount of 760 g. This implies that 500 g of the aluminum powder was nitrided by a nitriding yield of 100% to produce the aluminum nitride powder.

Namely, when aluminum (Al) is reacted with nitrogen (N) to form aluminum nitride, the weight of the product is 1.52 times of the weight of the reactant (i.e., (27+4)/27=1.52) theoretically. When producing the aluminum nitride powder of Example No. 1, the aluminum powder was charged in an amount of 500 g. Accordingly, the charged amount multiplied by a factor of 1.52 makes 760 g.

Moreover, when the aluminum nitride powder of Example No. 1 was analyzed, it was found that the nitrogen content was 34.1% by weight and the oxygen content was 0.68% by weight. Thus, from the result of the weight analysis as well, it was understood that the thus produced aluminum nitride powder had a nitriding yield of 100% substantially.

When the aluminum nitride powder was measured for the specific surface area, it exhibited such a high value as 3.1 m²/g. Table 4 below summarizes the production and analysis results of the aluminum nitride powder of Example No. 1.

The aluminum powder was produced by TOYO ALUMINIUM Co., Ltd., and its purity was 99.7%.

In Example No. 2, a large number of spaces were formed between the particles of the raw aluminum powder, which

TABLE 4

| | Production Result | | Analysis Result | | | | |
|---|---|---|---|---|---|---|---|
| Ex. | Total AlN Amount (g) | Formed AlN Amount (g) | Nitrogen Content (%) | Oxygen Content (%) | Ave. Primary Particle Dia. (μm) | Specific Surface Area (m²/g) | Crystallite Size (Å) |
| No.1 | 1,260 | 760 | 34.1 | 0.68 | 1 or less | 3.1 | Not Measured |
| No.2 | 1,260 | 760 | 34.0 | 0.73 | 1 or less | 2.8 | Not Measured |
| No.3 | 2,010 | 1,510 | 33.7 | 0.85 | 1 or less | Not Measured | 1,266 & 1,103 |
| No.4 | 2,520 | 1,520 | 34.1 | 0.74 | 1 or less | Not Measured | 1,224 & 1,234 |
| No.5 | 3,630 | 1,830 | 34.0 | 9.20 | 1 or less | Not Measured | 1,665 & 1,779 |
| No.6 | 2,010 | 1,510 | 33.9 | 0.75 | 1 or less | 3.2 | Not Measured |
| No.7 | 6,020 | 3,020 | 34.2 | 0.64 | 1 or less | 4.5 | Not Measured |

Figure 2A:
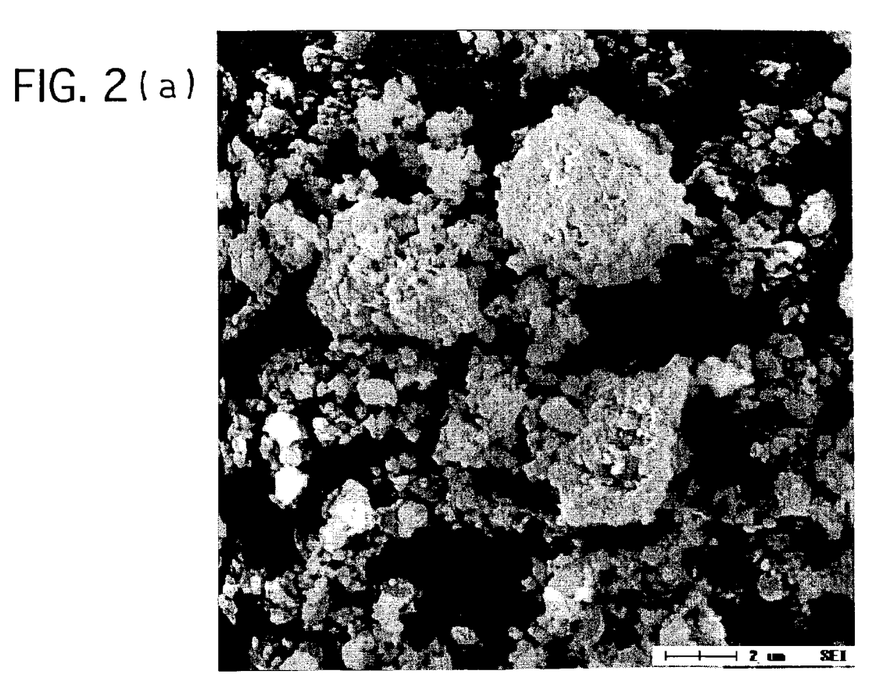
FIGS. 2(a) and 2(b) are SEM (i.e., scanning electron microscope) photographs on an aluminum nitriding powder of Example No. 1 according to the present invention.
Figure 2B:
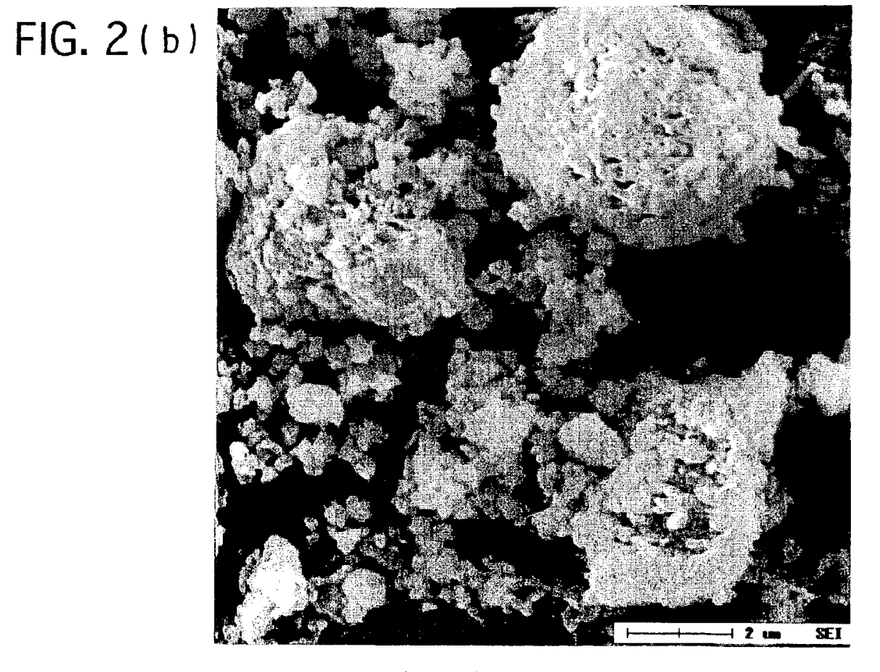

Moreover, the aluminum nitride powder of Example No. 1 was photographed with an SEM, and FIG. 2 shows the resulting SEM photographs. Here, FIG. 2 (a) is an SEM photograph whose magnification was 6,000 times, and that FIG. 2 (b) is an SEM photograph whose magnification was 4,000 times. Note that the SEM photographs shown in FIG. 2 were photographed after pulverizing the produced aluminum nitride powder with a mortar. It was possible to carry out the pulverizing with ease.

As shown in FIG. 2, it was confirmed that the aluminum nitride powder of Example No. 1 had particle diameters of 1 μm or less substantially. Thus, it is understood that the aluminum nitride powder of Example No. 1 made a fine powder which had been difficult to produce by the conventional aluminum nitride production methods. Note that, in FIG. 2, slightly coarse particles are observed. The slightly coarse particles were particles of the aluminum nitride powder used as part of the raw material. Moreover, in FIG. 2, large particles are appreciated. The large particles were secondary particles in which primary particles were agglomerated. It was possible to make the secondary particles into a fine aluminum nitride powder with ease by carrying out pulverizing.

From above, it is understood that the aluminum nitride powder of Example No. 1 was produced with a nitriding yield of 100% substantially and comprised fine aluminum nitride particles whose particle diameters were 1 μm or less.

In Example No. 1, it was further confirmed that aluminum nitride primary particles whose particle diameters were 1 μm or less were made from the aluminum powder whose average particle diameter was 30 μm, and that the specific surface area was increased simultaneously. It has been known that the reaction from aluminum to aluminum nitride is accompanied by a volumetric expansion of 16%. Thus, Example No. 1 shows that, when the nitriding reaction was developed at a lower temperature, the neighboring particles were adhered with each other by the volumetric expansion of aluminum resulting from the reaction even if no sintering occurred.

Example No. 2

As Example No. 2, a high-purity aluminum powder whose average particle diameter was 30 μm, was mixed with shredded aluminum foils, and was nitrided by using the nitriding furnace 1 to produce an aluminum nitride powder.

was to be nitrided, by including shredded aluminum foils which were coarser than the particles of the raw aluminum powder whose average particle diameter was 30 μm. Accordingly, it was an example in which the nitriding reaction was carried out on the assumption that, when the nitriding reaction was developed in an environment in which a large number of spaces existed, the spaces inhibited the particles from adhering even if the volumetric expansion occurred.

The shredded aluminum foils were formed by shredding an aluminum foil whose thickness was from 20 to 30 μm. The shredded aluminum foils had an apparent specific gravity of from 0.7 to 0.8, and had an aluminum purity of 99.7%. Note that each of the shredded aluminum foils had a different shape, because the shredded aluminum foils were formed by shredding the aluminum foil.

An aluminum nitride powder of Example No. 2 was produced in the following manner. First, the raw materials were weighed out as set forth in Table 1, and were mixed fully with a hand mixer. Specifically, the raw aluminum powder comprised the aluminum powder in an amount of 300 g, the shredded aluminum foils in an amount of 200 g, and an aluminum nitride powder whose average particle diameter was 1.6 μm in an amount of 500 g.

Subsequently, the raw aluminum powder was stored in the reactor tray 17 in the same manner as Example No. 1. After subjecting the raw aluminum powder to the nitrogen occlusion treatment by using the nitriding furnace 1, the nitriding reaction was developed. Moreover, when the initiation of the nitriding reaction was confirmed, the supply of the argon gas was started. The operating conditions of the nitriding furnace 1 were as set forth in Table 3.

Note that, in Example No. 2, the raw aluminum powder was held at 750° C. for 1 hour after it is held at 640° C. for 2 hours, because it included the coarse shredded aluminum foils therein. The extra heating was carried out in order to completely nitride the shredded aluminum foils.

Moreover, in Example No. 2, the electricity supply to the heater 12 was carried out automatically by using the computing apparatus 55. In addition, in Example No. 2, when the nitriding reaction was developed at 750° C., it was developed vigorously. Accordingly, the argon gas was supplied into the heat-resistant muffle 11 at a flow rate of 3 L/min. for about 15 minutes. Table 3 sets forth the reaction conditions in the nitriding reaction as well.

Assessment

In Example No. 2, the aluminum nitride powder was collected in an amount of 1,260 g, and the aluminum nitride powder was formed in an amount of 760 g. Table 4 summarizes the production and analysis results of the aluminum nitride powder of Example No. 2 as well. Note that, in the collected aluminum nitride powder, no shapes attributable to the shredded aluminum foils remained. The collected aluminum nitride powder was formed as a powder in a dry and crumbly state.

Thus, in the aluminum nitride powder of Example No. 2, the formed aluminum nitride occupied 760 g. The weight variation implied that 500 g of the aluminum powder was nitrided by a nitriding yield of 100%.

In the aluminum nitride powder of Example No. 2, the nitrogen content was 34.0% by weight, and the oxygen content was 0.73% by weight. Since the nitrogen content value was as high as 34.0%, it was found out that the nitriding yield was 100% substantially in the aluminum nitride powder of Example No. 2. Moreover, when the aluminum nitride powder of Example No. 2 was measured for the particle diameters, it had the particle diameters of 1 $\mu$m or less, similarly to the aluminum nitride powder of Example No. 1.

In addition, when the aluminum nitride powder was measured for the specific surface area, it exhibited such a high value as 2.8 $m^2/g$. Table 4 summarizes the production and analysis results of the aluminum nitride powder of Example No. 2 as well.

From above, it is understood that the aluminum nitride powder of Example No. 2 was produced with a nitriding yield of 100% substantially and comprised fine aluminum nitride particles whose particle diameters were 1 $\mu$m or less.

Example No. 3

As Example No. 3, a high-purity aluminum powder whose average particle diameter was 30 $\mu$m was mixed with shredded aluminum foils, and was nitrided by using the nitriding furnace 1 to produce an aluminum nitride powder. The aluminum powder was produced by TOYO ALUMINIUM Co., Ltd., and its purity was 99.7%.

Except that, in Example No. 3, the shredded aluminum foils were used in an amount of 300 g, the high-purity aluminum powder whose average particle diameter was 30 $\mu$m was used in an amount of 700 g, the reaction temperature was set at 630° C. in the nitriding reaction, the raw aluminum powder was nitrided under the same set conditions as those of Example No. 2.

In Example No. 3, since the aluminum powder, which was to be nitrided, was used in an amount of twice as large as that of Example No. 2, the total heat generation was twice as large as that of Example No. 2. Thus, it is an object of Example No. 3 to develop the nitriding reaction of the coarse shredded aluminum foils by the enlarged reaction heat.

Tables 1 through 3 set forth the composition of the raw aluminum powder and the specific reaction conditions in the nitriding reaction altogether. Note that, in Example No. 3 as well, the raw aluminum powder was stored in the reactor container 17, and the nitriding reaction was developed after subjecting the raw aluminum powder to the nitrogen occlusion treatment by using the nitriding furnace 1. Moreover, when the initiation of the nitriding reaction was confirmed, the supply of the argon gas was started. The operating conditions of the nitriding furnace 1 were as set forth in Table 2. In Example No. 3, the reaction time for the nitriding reaction was 3 hours and 30 minutes.

Assessment

In Example No. 3, the aluminum nitride powder was collected in an amount of 2,010 g, and the aluminum nitride powder was formed in an amount of 1,510 g. Table 4 summarizes the production and analysis results of the aluminum nitride powder of Example No. 3 as well. Note that, in the collected aluminum nitride powder, no shapes attributable to the aluminum foils remained. The shredded aluminum foils were turned into aluminum nitride particles.

Thus, in the aluminum nitride powder of Example No. 3, the formed aluminum nitride occupied 1,510 g. The weight variation implied that 1,000 g of the aluminum powder was nitrided by a nitriding yield of 100% substantially.

In the aluminum nitride powder of Example No. 3, the nitrogen content was 33.7% by weight, and the oxygen content was 0.85% by weight. Since the nitrogen content value was as high as 33.7%, it was found out that the nitriding yield was 100% substantially in the aluminum nitride powder of Example No. 3.

Moreover, when the crystallite size of the aluminum nitride powder of Example No. 3 was calculated from the half-value width by means of the X-ray diffraction analysis, it was 1,266 Å and 1,103 Å at two positions, respectively. Table 4 summarizes the analysis results of the aluminum nitride powder of Example No. 3 altogether.

From above, it is understood that the aluminum nitride powder of Example No. 3 was produced with a nitriding yield of 100% substantially and comprised fine aluminum nitride particles whose particle diameters were 1 $\mu$m or less.

Example No. 4

As Example No. 4, a high-purity aluminum powder whose average particle diameter was 30 $\mu$m was stored in the upper and lower stages of reactor trays which were laminated in three stages, and was nitrided by using the nitriding furnace 1 to produce an aluminum nitride powder. The aluminum powder was produced by TOYO ALUMINIUM Co., Ltd., and its purity was 99.7%.

Specifically, 1,000 g of the raw aluminum powder was mixed fully with 1,000 g of a homemade aluminum nitride powder by using a hand mixer. Note that the homemade aluminum nitride powder was produced in the following manner. An aluminum nitride powder was produced in the same manner as Example No. 1. The resulting aluminum nitride powder was pulverized, and was thereafter sieved to under 500 mesh.

The fully mixed raw mixture powder was divided into sections of 1,000 g, respectively. Each of the sections was stored in an independent reactor tray. The two reactor trays with the divided raw material powder stored therein were laminated by way of an empty tray. It is an object of Example No. 4 to carry out the nitriding reaction on the assumption that the heater 12 of the nitriding furnace 1 could control the temperatures of the two reactor trays, i.e., the upper and lower stages of the laminated reactor trays, individually.

The laminated reactor trays were disposed at the center in the heat-resistant muffle 11 of the nitriding furnace 1 illustrated in FIG. 1. Note that, in Example No. 4 as well, the nitriding reaction was developed after subjecting the raw mixture powder to the nitrogen occlusion treatment by using the nitriding furnace 1. Moreover, when the initiation of the nitriding reaction was confirmed, the supply of the argon gas was started. The reaction conditions in the nitriding reaction were set as set forth in Table 3 altogether.

In the nitriding reaction of Example No. 4, a slight pressure decrement, e.g., from 132.9 kPa to 131.0 kPa, was detected within the heat-resistant muffler 11 after 4 minutes passed since the set reaction temperature, e.g., 630° C., was attained. Accordingly, the electricity supply was decreased to 30%. Note that the argon gas was supplied with a flow rate of 1.5 L/min. in this instance. The heat generation was observed only at the lower stage of the reactor trays on this occasion. Due to the decrement of the electricity supply, the temperature of the upper stage of the reactor trays was dropped to fall in a range of from 580 to 590° C. Consequently, the electricity supply to the heater 12 was increased to 60% after 1.5 hours passed since the production started. As a result, the nitriding reaction was initiated when the temperature of the raw mixture powder in the upper stage of the reactor trays was 640° C.

The temperature difference was measured by the thermocouples 52 between the inside and outside of the bottom of the heat-resistant muffle 11, and was found to fall in a range of from 5 to 80° C. In Example No. 4, the reaction time for the nitriding reaction was 3 hours and 20 minutes.

Assessment

In Example No. 4, the aluminum nitride powder was collected in an amount of 1,260 g for the upper stage of the reactor trays and in an amount of 1,260 g for the lower stage thereof, and the aluminum nitride powder was formed in a total amount of 1,520 g, i.e., in an amount of 760 g for the upper stage of the reactor trays and in an amount of 760 g for the lower stage thereof. Table 4 summarizes the production and analysis results of the aluminum nitride powder of Example No. 4 as well.

Thus, in the aluminum nitride powder of Example No. 4, the formed aluminum nitride occupied 1,520 g in total. The weight variation implied that 1,000 g of the aluminum powder was nitrided by a nitriding yield of 100% substantially.

According to the results of the weight analysis on the aluminum nitride powder of Example No. 4, the nitrogen content was 34.1% by weight, and the oxygen content was 0.74% by weight. Since the nitrogen content value was as high as 34.1%, it was found out that the nitriding yield was 100% substantially in the aluminum nitride powder of Example No. 4.

Moreover, when the crystallite size of the aluminum nitride powder of Example No. 4 was calculated from the half-value width by means of the x-ray diffraction analysis, it was 1,224 Å and 1,234 Å at two positions, respectively. Table 4 summarizes the analysis results of the aluminum nitride powder of Example No. 4 altogether.

From above, it is understood that the aluminum nitride powder of Example No. 4 was produced with a nitriding yield of 100% substantially and comprised fine aluminum nitride particles whose particle diameters were 1 µm or less. Moreover, when the nitriding reaction was developed, the initiation of the heat generation deviated between the upper and lower stages of the reactor trays 17. Hence, the present inventors discovered that it was possible to shift the occurrence of the nitriding reaction within the identical furnace. In Example No. 4, the raw aluminum powder was used in a total amount of 1,000 g, i.e., the sum of 500 g and 500 g, it was relatively easy to absorb the reaction heat. However, assuming that the storage amount of the raw aluminum powder in each of the stages of the reactor trays is enlarged, it is very advantageous if the occurrence of the nitriding reaction can be shifted for the respective stages of the reactor trays. For instance, when the heater of the nitriding furnace can control the temperatures of the upper, middle and lower stages of the reactor trays individually, it is possible to shift the occurrence of the nitriding reaction in the respective reactor trays so that the processed amount of the raw aluminum powder can be enlarged in a single nitriding furnace.

Example No. 5

Except that an aluminum powder was also stored in the middle stage of the reactor trays which were laminated in three stages, and was nitrided by using the nitriding furnace 1, an aluminum nitride powder of Example No. 5, was produced in the same manner as Example No. 4.

Specifically, 1,200 g of a high-purity aluminum powder whose average particle diameter was 30 µm was mixed fully with 1,800 g of a homemade aluminum nitride powder by using a hand mixer. The aluminum powder was produced by TOYO ALUMINIUM Co., Ltd., and its purity was 99.7%. Note that the homemade aluminum nitride powder was produced in the following manner. An aluminum nitride powder was produced in the same manner as Example No. 1. The resulting aluminum nitride powder was pulverized, and was thereafter sieved to under 500 mesh.

The fully mixed raw mixture powder was divided into three sections of 1,000 g, respectively. Each of the sections was stored in an independent reactor tray. The three reactor trays with the divided raw mixture powder stored therein were laminated, and were accommodated inside the heat-resistant muffle 11. Then, the nitriding reaction was developed. Note the specific conditions were as set forth in Tables 2 and 3.

In Example No. 5, contrary to Example No. 4, there was the workpiece in each of the three stages of the reactor trays, and the set reaction temperature was increased by about 10° C. Accordingly, the initiation of the nitriding reaction was delayed more in the upper stages of the reactor trays, however, heat generation occurred in the workpiece stored in all of the three stages of the reactor trays. All the heat generated in the three stages of the reactor trays was released to the outside of the heat-resistant muffle 11 by way of the reactor trays as well as the furnace wall of the heat-resistant muffle 11 in which the reactor trays were placed. Consequently, the temperature difference between the inside and outside of the furnace wall of the heat-resistant muffler 11 was kept to fall in a range of from 60 to 90° C. for 1.5 hours. Specifically, the temperature of the workpiece within the heat-resistant muffle 11 of the nitriding furnace 1 fell in a range of from 630 to 650° C. On the other hand, the temperature of the outside of the heat-resistant muffle 11 fell in a range of from 550 to 590° C.

In the nitriding reaction, the temperature difference between the inside and outside of the bottom of the heat-resistant muffle 11 fell in a range of from 5 to 90° C. In Example No. 5, the reaction time for the nitriding reaction was 3 hours and 40 minutes.

Assessment

In Example No. 5, the aluminum nitride powder was collected in an amount of 1,210 g for the upper stage of the reactor trays, in an amount of 1,210 g for the middle stage thereof, and in an amount of 1,210 g for the lower stage thereof. Accordingly, the aluminum nitride powder was collected in a summed amount of 3,630 g. The aluminum nitride powder was formed in an amount of 610 g for the upper stage of the reactor trays, in an amount of 610 g for the middle stage thereof, and in an amount of 610 g for the lower stage thereof. Consequently, the aluminum nitride powder was formed in a summed amount of 1,830 g. No difference arose in the nitriding yield in the aluminum nitride powders produced in the respective upper, middle and lower stages of the reactor trays. Table 4 summarizes the production and analysis results of the aluminum nitride powder of Example No. 5 as well.

Thus, in the aluminum nitride powder of Example No. 5, the formed aluminum nitride occupied 1,830 g in total. The weight variation implied that 1,200 g of the aluminum powder was nitrided with a nitriding yield of 100% substantially.

According to the results of the weight analysis on the aluminum nitride powder of Example No. 5, the nitrogen content was 34.0% by weight, and the oxygen content was 9.20% by weight. Since the nitrogen content value was as high as 34.0%, it was found out that the nitriding yield was 100% substantially in the aluminum nitride powder of Example No. 5.

Moreover, when the crystallite size of the aluminum nitride powder of Example No. 5 was calculated from the half-value width by means of the X-ray diffraction analysis, it was 1,665 Å and 1,779 Å at two positions, respectively. Table 4 summarizes the analysis results of the aluminum nitride powder of Example No. 5 altogether.

Figure 3A:
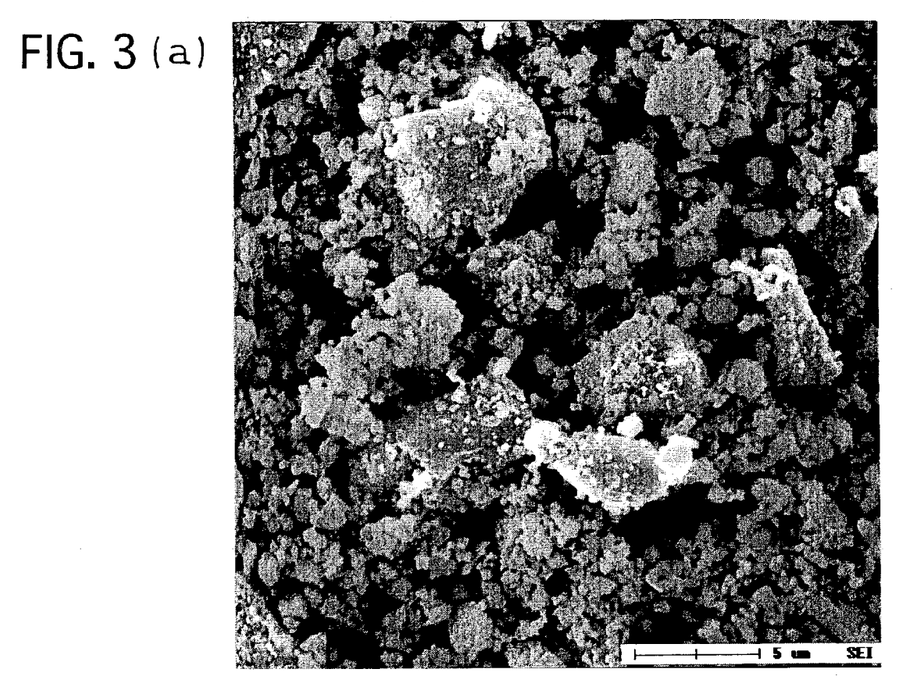
FIGS. 3(a) and 3(b) are SEM photographs on an aluminum nitriding powder of Example No. 5 according to the present invention.
Figure 3B:
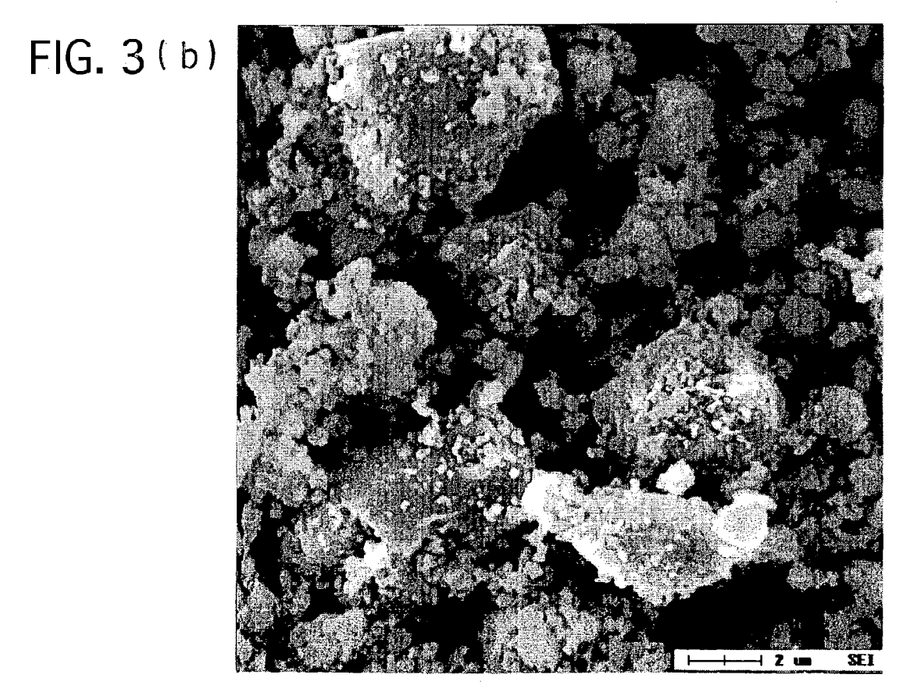

Moreover, the aluminum nitride powder of Example No. 5 was photographed with an SEM, and FIG. 3 shows the resulting SEM photographs. Here, FIG. 3(a) is an SEM photograph whose magnification was 2,800 times, and that FIG. 3(b) is an SEM photograph whose magnification was 4,000 times. Note that the SEM photographs shown in FIG. 3 were photographed after pulverizing the produced aluminum nitride powder with a mortar. It was possible to carry out the pulverizing with ease.

As shown in FIG. 3, it was confirmed that the aluminum nitride powder of Example No. 5 had particle diameters of 1 μm or less substantially. Thus, it is understood that the aluminum nitride powder of Example No. 5 made a fine powder which had been difficult to produce by the conventional aluminum nitride production methods.

From above, it is understood that the aluminum nitride powder of Example No. 5 was produced with a nitriding yield of 100% substantially comprised fine aluminum nitride particles whose particle diameters were 1 μm or less.

Example No. 6

As Example No. 6, a high-purity aluminum powder whose average particle diameter was 30 μm was nitrided by using the nitriding furnace 1 to produce an aluminum nitride powder. The aluminum powder was "AHL2504 (brand name)" produced by TOYO ALUMINIUM Co., Ltd., and its purity was 99.95%.

First, 1,000 g of the raw aluminum powder and 1,500 g of an aluminum nitride powder were mixed fully by a type "V" blender. The aluminum nitride powder was "UF (brand name)" produced by TOYO ALUMINIUM Co., Ltd., and its average particle diameter was 1.6 μm. Table 1 also sets fort the mixing proportions of the raw materials.

Then, the raw mixture powder was stored in the reactor tray 17. The reactor tray 17 was placed in the heat-resistant muffle 11. The reactor tray 17 was used independently in one stage. Note that the raw mixture powder was not compressed when it was stored in the reactor tray 17.

Thereafter, the valve 22 of the gas supplying apparatus 2 and the valve 42 of the discharging apparatus 4 were opened to keep supplying a nitrogen gas into the heat-resistant muffle 11 at a flow rate of 8 L/min. The pressure within the heat-resistant muffle 11 was kept in a range of from 120 to 150 kPa. Accordingly, within the heat-resistant muffle 11, the dew point was −50° C. or less when the temperature was raised to 450° C. Note that the dew point was observed by using the dew-point hygrometer 45.

While supplying the nitrogen gas into the heat-resistant muffle 11 at the flow rate of 8 L/min., the heater 12 of the nitriding furnace 1 was turned on to increase the temperature within the heat-resistant muffle 11 to 460° C. at a temperature increment rate of 7° C./min. Then, the temperature was kept for 30 minutes.

Subsequently, the temperature within the heat-resistant muffle 11 was increased to 670° C. at a temperature increment rate of 4° C./min. to develop the nitriding reaction under processing conditions set forth in Table 2.

Descriptions will be hereinafter made on the flow rates of the nitrogen gas and argon gas, the electricity supply, the temperatures, resulting from the flow rates and electricity supply, within the heat-resistant muffle 11 as well as in the workpiece, and the temperature difference between the inside and outside of the furnace wall of the heat-resistance muffle 11. When the temperature within the heat-resistant muffle 11 reached 670° C. and the nitriding reaction was initiated, or when the pressure was decreased within the heat-resistant muffler 11, the valve 26 of the gas supplying apparatus 2 was opened to supply an argon gas into the heat-resistant muffle 11 at a flow rate of from 2 to 6 L/min.

In the middle of the operation, when the rate of the nitriding reaction was slow, the valve 26 was closed to decrease or stop the supply of the argon gas, and the valve 22 is further opened to increase the flow rate of the nitrogen gas to 12 L/min. Thus, the nitriding reaction was developed.

When the raw mixture powder was held in the state for 30 minutes, no gas pressure drop and temperature increment were observed. Thus, the present inventors confirmed the termination of the nitriding reaction. The reaction time was about 2 hours.

Note that the reaction temperature was controlled by adjusting the electricity supply to the heater 12 in a range of from 10 to 55% in the development of the nitriding reaction. Moreover, the industry air was supplied to the furnace wall of the heat-resistant muffle 11 by the air supplying apparatus 15 so that the temperature of the furnace wall was kept in a range of from 500 to 550° C. The temperature of the workpiece fell in a range of from 675 to 723° C. from the initiation to completion of the nitriding reaction. In addition, the temperature difference between the inside and outside of the furnace wall of the heat-resistant muffle 11 fell in a range of from 5 to 50° C.

Finally, the heat-resistant muffle 11 was cooled, and an aluminum nitride powder in the reactor tray 17 was collected. Thus, the aluminum nitride powder of Example No. 6 was produced.

Assessment

The aluminum nitride powder of Example No. 6 was collected in an amount of 3,010 g. Since 1,500 g of the aluminum nitride powder was used as part of the raw material, aluminum nitride was formed in an amount of 1,510 g. This implies that 1,000 g of the aluminum powder was nitrided by a nitriding yield of 100% substantially to produce the aluminum nitride powder.

Moreover, when the aluminum nitride powder of Example No. 6 was analyzed, it was found that the nitrogen content was 33.9% by weight and the oxygen content was 0.75% by weight. Thus, from the result of the weight analysis as well, it was understood that the thus produced aluminum nitride powder had a nitriding yield of 100% substantially.

In addition, when the aluminum nitride powder was measured for the specific surface area, it exhibited such a high value as 3.2 m$^2$/g. Table 4 summarizes the production and analysis results of the aluminum nitride powder of Example No. 6 as well.

From above, it is understood that the aluminum nitride powder of Example No. 6 was produced with a nitriding yield of 100% substantially and comprised fine aluminum nitride particles whose particle diameters were 1 μm or less.

Example No. 7

As Example No. 7, a high-purity aluminum powder whose average particle diameter was 30 μm was stored in the upper and lower stages of reactor trays which were laminated in three stages, and was nitrided by using the nitriding furnace 1 to produce an aluminum nitride powder. The aluminum powder was "AHL 2504 (brand name)" produced by TOYO ALUMINIUM Co., Ltd., and its purity was 99.95%.

Specifically, 2,000 g of the raw aluminum powder was mixed fully with 3,000 g of a homemade aluminum nitride powder by a type "V" blender. Note that the homemade aluminum nitride powder was produced in the following manner. An aluminum nitride powder was produced in the same manner as Example No. 1. The resulting aluminum nitride powder was pulverized, and was thereafter sieved to under 500 mesh.

The fully mixed raw mixture powder was divided into sections of 2,500 g, respectively. Each of the sections was stored in an independent reactor tray. The two reactor trays with the divided raw material powder stored therein were laminated by way of an empty tray. It is an object of Example No. 7 to carry out the nitriding reaction on the assumption that the heater 12 of the nitriding furnace 1 could control the temperatures of the two reactor trays, i.e., the upper and lower stages of the laminated reactor trays, individually.

Thereafter, in Example No. 7 as well, the raw mixture powder was subjected to the nitrogen occlusion treatment in the same manner as Example No. 6, and thereafter the nitriding reaction was developed. Moreover, when the initiation of the nitriding reaction was confirmed, the supply of the argon gas was started. Table 3 also sets forth the reaction conditions of the nitriding reaction in Example No. 7.

Assessment

In Example No. 7, the aluminum nitride powder was collected in an amount of 6,020 g. Since the homemade aluminum nitride powder was used as part of the raw material in an amount of 3,000 g, the aluminum nitride powder was formed in an amount of 3,020 g. This implies that 2,000 g of the aluminum powder was nitrided by a nitriding yield of 100% substantially to produce the aluminum nitride powder.

Moreover, when the aluminum nitride powder of Example No. 7 was analyzed, it was found that the nitrogen content was 34.2% by weight and the oxygen content was 0.64% by weight. Thus, from the result of the weight analysis as well, it was understood that the thus produced aluminum nitride powder had a nitriding yield of 100% substantially.

In addition, when the aluminum nitride powder was measured for the specific surface area, it exhibited such a high value as 4.5 m$^2$/g. Table 4 summarizes the production and analysis results of the aluminum nitride powder of Example No. 7 as well.

From above, it is understood that the aluminum nitride powder of Example No. 7 was produced with a nitriding yield of 100% substantially and comprised fine aluminum nitride particles whose particle diameters were 1 μm or less.

According to Example Nos. 1 through 7, it was possible to develop the nitriding reaction at a lower temperature and to produce aluminum nitride powders comprising fine particles whose particle diameters are small by using the process for producing aluminum nitride according to the present invention.

Moreover, in Example Nos. 1 through 7 according to the present invention, the aluminum nitride powders were produced with a nitriding yield of 100% substantially. Accordingly, when the reactor trays were used as described in Example Nos. 1 through 7, no impurities mingled with the products. Therefore, it is possible to reduce the costs required for producing aluminum nitride powders by using the reactor trays as disclosed in Example Nos. 1 through 7.

Having now fully described the present invention, it will be apparent to one of ordinary skill in the art that many changes and modifications can be made thereto without departing from the spirit or scope of the present invention as set forth herein including the appended claims.

What is claimed is:

1. A process for producing aluminum nitride powder comprising the step of:
    holding an aluminum powder in a nitrogen atmosphere whose nitrogen gas pressure falls in a range of from 105 to 300 kPa, so as to develop a nitriding reaction, and supplying a reaction controller gas into a reactor chamber in which the aluminum powder is located to adjust the temperature in a range of 600° C. to 750° C., thereby controlling the nitriding reaction, wherein the nitriding reaction comprises nitriding the aluminum powder directly with nitrogen, wherein the nitriding reaction is performed at a temperature from 600° C. to 750° C., and wherein the reaction controller gas is argon gas.

2. The process for producing aluminum nitride powder set forth in claim 1, wherein the nitriding reaction is developed after subjecting the aluminum powder to a nitrogen occlusion treatment in which the aluminum powder is held in a nitrogen gas atmosphere of 450 to 600° C. for 30 to 120 minutes to have nitrogen occluded in the aluminum powder.

3. The process for producing aluminum nitride powder set forth in claim 1, wherein the nitriding reaction releases heat to the outside of the reactor chamber by way of a furnace wall of a reactor furnace, demarcating the reactor chamber, and controlling a temperature difference between a workpiece temperature and an initiation temperature of the nitriding reaction to 100° C. or less.

4. The process for producing aluminum nitride powder set forth in claim 1, wherein the nitrogen gas atmosphere is maintained by a nitrogen gas, which is delivered from a nitrogen gas supplying apparatus for continuously supplying a nitrogen gas to the reactor chamber, and a nitrogen gas, which is discharged from a discharging apparatus for discharging a nitrogen gas from the reactor chamber.

5. The process for producing aluminum nitride powder set forth in claim 1, wherein the reaction controller gas is supplied to the reactor chamber when the nitrogen gas pressure within the reactor chamber drops.

6. The process for producing aluminum nitride powder set forth in claim 3, wherein the reaction controller gas is supplied into the reactor chamber when the workpiece temperature rises.

7. The process for producing aluminum nitride powder set forth in claim 1, wherein the reaction controller gas is supplied into the reactor chamber in a proportion of from 1 to 50% by volume when a gas amount within the reactor chamber is taken as 100% by volume.

8. The process for producing aluminum nitride set forth in claim 1, wherein it takes from 2 to 10 hours for the nitriding reaction to complete after the aluminum powder is heated to a predetermined reaction temperature.

9. The process for producing aluminum nitride powder set forth in claim 8, wherein the supply of the reaction controller gas is started when the aluminum powder is heated to the predetermined temperature, the supply amount of the reaction controller gas is increased gradually to a predetermined partial gas pressure which can control the development of the nitriding reaction, the partial gas pressure of the reaction controller gas is decreased gradually after maintaining the predetermined partial gas pressure for a predetermined period of time, and the supply of the reaction controller gas is stopped.

10. The process for producing aluminum nitride powder set forth in claim 9, wherein a nitrogen gas is further supplied into the reactor chamber after the supply of the reaction controller gas is stopped.

* * * * *